US008876156B2

(12) United States Patent
Turnbull et al.

(10) Patent No.: US 8,876,156 B2
(45) Date of Patent: Nov. 4, 2014

(54) REDUCED VOLUME AIR BAG

(75) Inventors: Roy C. Turnbull, Shelby Township, MI (US); Swagat Goswami, Rochester, MI (US)

(73) Assignee: TRW Vehical Safety Systems Inc., Washington, MI (US)

( * ) Notice: Subject to any disclaimer, the term of this patent is extended or adjusted under 35 U.S.C. 154(b) by 6 days.

(21) Appl. No.: 13/017,150

(22) Filed: Jan. 31, 2011

(65) Prior Publication Data

US 2012/0193896 A1    Aug. 2, 2012

(51) Int. Cl.
*B60R 21/205*    (2011.01)
*B60R 21/231*    (2011.01)
*B60R 21/233*    (2006.01)
*B60R 21/2334*   (2011.01)
*B60R 21/2338*   (2011.01)

(52) U.S. Cl.
CPC ........... *B60R 21/205* (2013.01); *B60R 21/2334* (2013.01); *B60R 21/233* (2013.01); *B60R 2021/23386* (2013.01); *B60R 2021/23308* (2013.01); *B60R 2021/23316* (2013.01); *B60R 21/231* (2013.01)
USPC ......................... 280/732; 280/729; 280/743.1

(58) Field of Classification Search
CPC  B60R 21/231; B60R 21/233; B60R 21/2334; B60R 2021/233; B60R 2021/23386; B60R 21/205
USPC .......... 280/729, 731, 730.1, 732, 743.1, 743.2
See application file for complete search history.

(56) References Cited

U.S. PATENT DOCUMENTS

| 3,731,949 | A  | * | 5/1973  | Radke ........................ 280/743.1 |
| 3,784,225 | A  | * | 1/1974  | Fleck et al. ................... 280/729 |
| 3,960,386 | A  | * | 6/1976  | Wallsten ....................... 280/731 |
| 3,970,328 | A  | * | 7/1976  | Wallsten ....................... 280/731 |
| 4,003,588 | A  | * | 1/1977  | Oka et al. .................... 280/743.1 |
| 4,076,277 | A  | * | 2/1978  | Kuwakado et al. ........... 280/738 |
| 5,427,410 | A  | * | 6/1995  | Shiota et al. ............... 280/743.1 |
| 6,517,109 | B1 | * | 2/2003  | Van Poppel ................ 280/743.1 |
| 6,786,505 | B2 | * | 9/2004  | Yoshida ........................ 280/729 |
| 6,971,664 | B2 | * | 12/2005 | Amamori ...................... 280/729 |
| 7,025,376 | B2 | * | 4/2006  | Dominissini ................. 280/729 |

(Continued)

FOREIGN PATENT DOCUMENTS

| WO | 2006041345    |   | 4/2006 |
| WO | 2008030144    |   | 3/2008 |
| WO | WO 2009/056202 | * | 5/2009 |

*Primary Examiner* — Paul N Dickson
*Assistant Examiner* — George Spisich
(74) *Attorney, Agent, or Firm* — Tarolli, Sundheim, Covell & Tummino LLP

(57) ABSTRACT

An apparatus (10) for helping to protect an occupant (20) of a vehicle (12) includes an inflatable vehicle occupant protection device (14) having a deflated condition and an inflated condition. The protection device (14) includes a front portion (70) that has a panel (72) presented toward the occupant (20) when the protection device (14) is in the inflated condition and a rear portion (80) spaced from the front portion (70) when the protection device (14) is in the inflated condition. A lower connecting portion (90) connects the front portion (70) to the rear portion (80) and defines the lower extent of the protection device (14). A space (100) is positioned outside the inflatable volume (60) of the protection device (14) and is defined between the front portion (70), the connecting portion (90), and the rear portion (80). The space (100) extends from an upper extent of the protection device (14) down to below a midline of the protection device (14).

21 Claims, 6 Drawing Sheets

(56) References Cited

U.S. PATENT DOCUMENTS

| | | | |
|---|---|---|---|
| 7,798,520 B2 * | 9/2010 | Feller et al. | 280/729 |
| 7,992,897 B2 * | 8/2011 | Sekino et al. | 280/739 |
| 8,196,955 B2 * | 6/2012 | Mendez | 280/729 |
| 8,511,710 B2 * | 8/2013 | Fukawatase | 280/743.1 |
| 2002/0089158 A1 * | 7/2002 | Fischer et al. | 280/740 |
| 2009/0140509 A1 | 6/2009 | Johansson et al. | |
| 2010/0327568 A1 * | 12/2010 | Baumann et al. | 280/743.1 |
| 2011/0049846 A1 * | 3/2011 | Hirth et al. | 280/729 |

* cited by examiner

REDUCED VOLUME AIR BAG

FIELD OF THE INVENTION

The present invention relates to an apparatus for helping to protect an occupant of a vehicle. More particularly, the present invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

Another type of air bag is a side impact air bag inflatable between a side structure of a vehicle and a vehicle occupant. Side impact air bags may, for example, be seat mounted, side structure mounted, or door mounted. Another type of air bag is an inflatable knee bolster inflatable between an instrument panel and/or steering column of a vehicle and a vehicle occupant. Inflatable knee bolsters may, for example, be mounted in the instrument panel or on the steering column.

Passenger side and frontal air bags are typically designed to extend to a height within the vehicle that provides a barrier between the head of a taller vehicle occupant and a windshield of the vehicle. This air bag height adds volume to the air bag and places a portion of the air bag volume above the shoulders of a shorter occupant. There is a need in the art for an air bag construction that reduces the volume of the air bag above the shoulders of taller and shorter occupants.

SUMMARY OF THE INVENTION

The present invention relates to an apparatus for helping to protect an occupant of a vehicle. The apparatus includes an inflatable vehicle occupant protection device that has a deflated condition and an inflated condition. The protection device includes a front portion that includes an inflatable volume and that has a panel presented toward the occupant when the protection device is in the inflated condition. A rear portion includes an inflatable volume and is spaced from the front portion when the protection device is in the inflated condition. A lower connecting portion connects the lower portions of the front portion to the rear portion and defines the lower extent of the protection device. A space is positioned outside the inflatable volume and is defined between the front portion, the connecting portion, and the rear portion. The space extends from an upper extent of the protection device down to below a midline of the protection device.

The present invention also relates to an apparatus for helping to protect an occupant. The apparatus includes an inflatable vehicle occupant protection device that has a deflated condition and an inflated condition. The protection device includes a front portion having an inflatable volume and a panel presented toward the occupant when the protection device is in the inflated condition. A rear portion includes an inflatable volume that is spaced from the front portion when the protection device is in the inflated condition. A lower connecting portion connects the front portion and the rear portion and may provide fluid communication between the rear portion and the front portion. At least one lateral support member connects the front portion to the rear portion for stabilizing the front portion, limiting relative movement between the front portion and the rear portion, and optionally providing fluid communication between the rear and front portions. The at least one support member is spaced from the connecting portion for defining a lateral opening in the protection device.

The present invention also relates to an apparatus for helping to protect an occupant of a vehicle that has an instrument panel and a seat. The apparatus includes an inflatable vehicle occupant protection device inflatable away from the instrument panel of the vehicle to an inflated position between the instrument panel and an occupant of the vehicle seat. The protection device includes inflatable chambers arranged in a generally U-shaped configuration. The chambers arranged in the U-shaped configuration include spaced first and second vertical chambers and a lower horizontal chamber that interconnects the vertical chambers. The first vertical chamber includes a rear chamber for being positioned adjacent the instrument panel. The second vertical chamber includes a front chamber for being positioned toward an occupant of the vehicle seat.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

Figure 1:
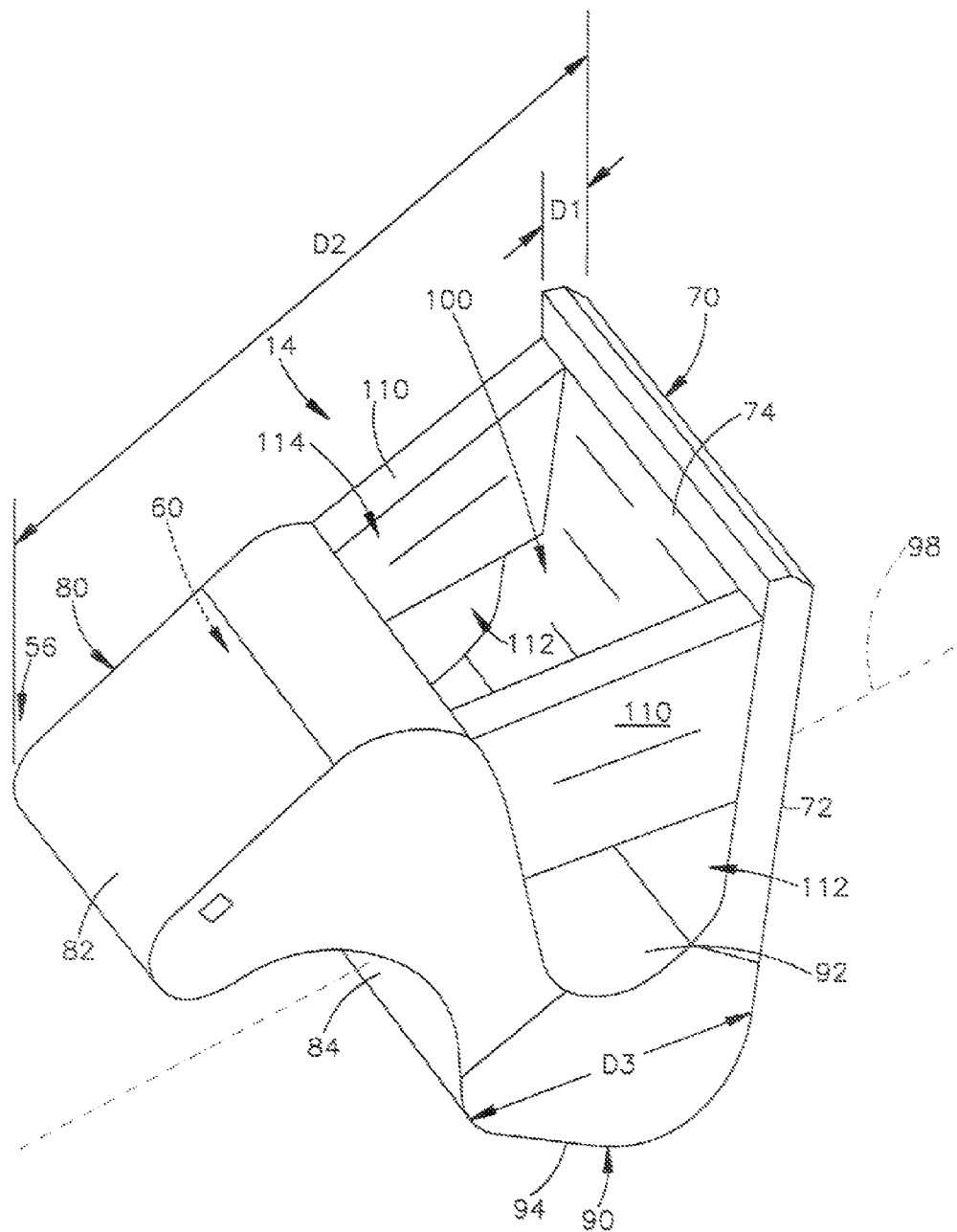
FIG. 1 is a schematic illustration of an apparatus for helping to protect an occupant of a vehicle in accordance with an embodiment of the present invention.

An apparatus 10 for helping to protect an occupant 20 of a vehicle 12 includes an inflatable vehicle occupant protection device 14 in the form of an air bag. In the embodiment illustrated in FIGS. 1-5, the air bag 14 is a passenger frontal air bag for helping to protect an occupant 20 of a seat 22 on a passenger side 24 of the vehicle 12. As shown in FIGS. 2-5, the vehicle 12 also includes a seatbelt 18 for helping to protect the vehicle occupant 20.

The air bag 14 may be part of an air bag module 30 that includes an inflator 32 and a housing 34. The air bag 14 has a stored condition, indicated by dashed lines in FIG. 2, in which the air bag is folded and placed in a stored condition within the housing 34. The module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 2 to uncover an opening 44 through which the air bag 14 may be deployed from the stored condition in the housing 34 to an inflated condition. The door 40 may be connected to the vehicle 12, e.g., the instrument panel 36, either directly or through the housing 34, by means (not shown), such as a plastic hinge portion, a strap, or a tether.

The inflator 32 is actuatable to provide inflation fluid to an inflatable volume 60 of the air bag 14 to deploy the air bag to the inflated condition. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 60 of the air bag 14 in a known manner. The inflating air bag 14 exerts a force on the door 40, which moves the door to the opened condition. The air bag 14 inflates from the stored condition to a deployed condition, such as the fully inflated, deployed, and pressurized condition illustrated in solid lines in FIG. 2. The air bag 14, while inflated, helps protect the vehicle occupant 20 from impacts with parts of the vehicle 12, such as the instrument panel 36.

As shown in FIG. 1, the air bag 14 may have a generally U-shaped construction including spaced, generally vertically extending portions interconnected at their lower ends by a generally horizontally extending portions. The vertical portions comprise a front portion 70 and a rear portion 80. The lower horizontal portion comprises a connecting portion 90 that interconnects the front portion 70 and the rear portion 80. The front portion 70, rear portion 80, and connecting portion 90 each define inflatable volumes that through their interconnection help define the inflatable volume 60 of the air bag 14. The front portion 70, the rear portion 80, and the connecting portion 90 each may include non-inflatable portions (not shown) in addition to their respective inflatable portions. The front portion 70 includes a front panel 72 that is presented toward the occupant 20 when the air bag 14 is inflated and an opposite rear panel 74 presented away from the occupant. The front panel 72 is spaced from the rear panel 74 by a distance or depth D1 extending in a fore-aft direction of the vehicle.

Figure 2:
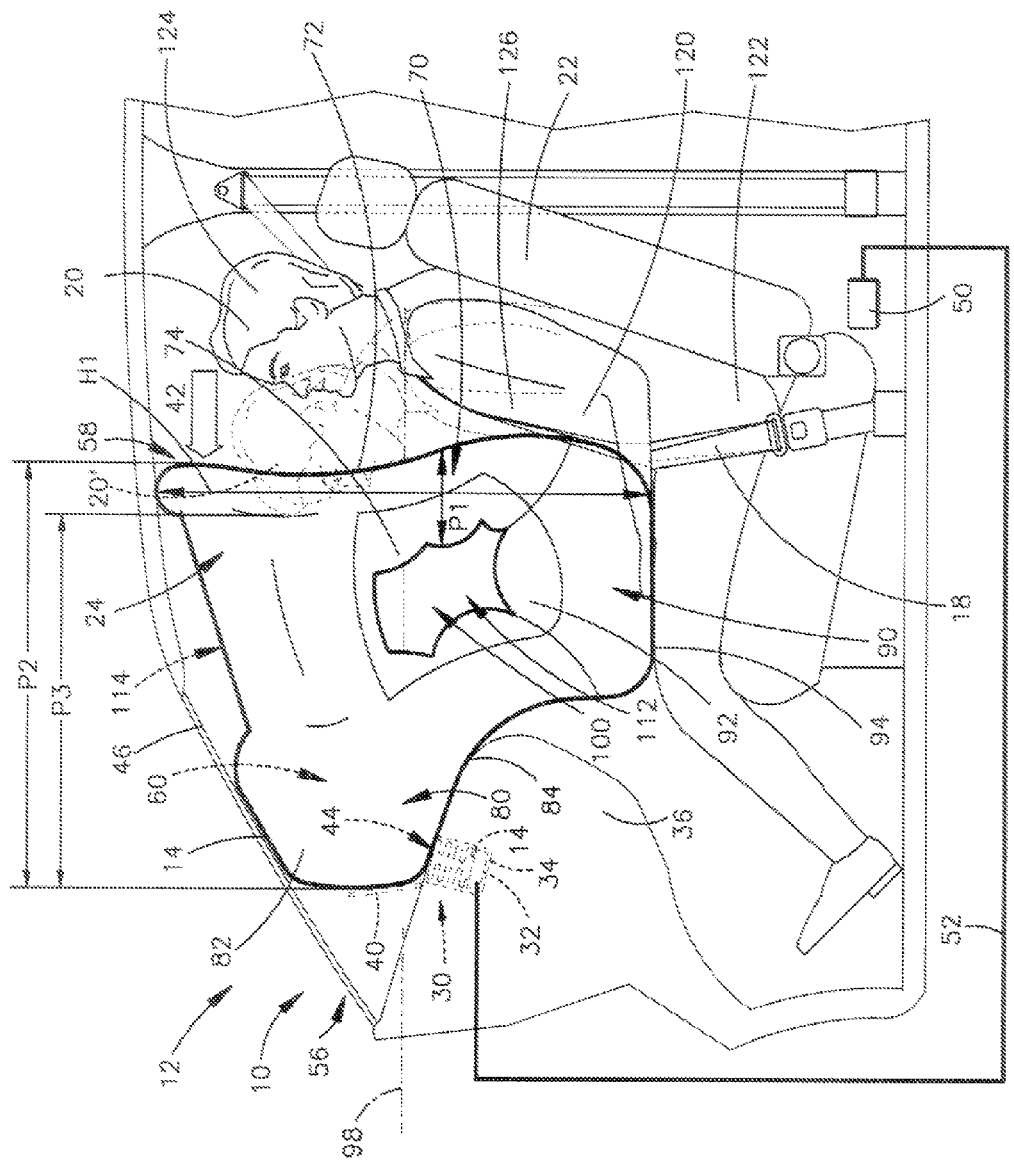
FIG. 2 is a schematic side view of the apparatus of FIG. 1 illustrating different conditions with a belted vehicle occupant.

The rear portion 80 of the air bag 14 includes a top panel 82 and a bottom panel 84 that are configured to occupy the space between the instrument panel 36 of the vehicle 12 and the windshield 46 when the air bag is inflated in order to stabilize the air bag (see FIG. 2). Stabilization of the air bag 14 during inflation may be enhanced by sizing the rear portion 80, e.g., the top panel 82 and/or the bottom panel 84, to be somewhat larger than the space between the instrument panel 36 and the windshield 46 such that the rear portion is deformed upon contact with the instrument panel and/or the windshield. The rear portion 80 may thus extend adjacent to both the instrument panel 36 and the windshield 46.

The connecting portion 90 includes a top panel 92 and a bottom panel 94. The top panel 92 of the connecting portion 90 is connected to the top panel 82 of the rear portion 80 and the rear panel 74 of the front portion 70. The bottom panel 94 of the connecting portion 90 is connected to the bottom panel 84 of the rear portion 80 and the front panel 72 of the front portion 70. Together, the front portion 70, the rear portion 80, and the connecting portion 90 form a substantially U-shaped air bag 14 that extends between the occupant 20, the instrument panel 36, and the windshield 46 of the vehicle 12 when inflated. The air bag 14 has a height, when inflated, indicated by H1 in FIG. 2, equal to the distance between the uppermost edge of the front portion 70 and the lowermost edge of the connecting portion 90 relative to the vehicle occupant 20. A midline 98 of the air bag 14 extends through the air bag in the fore-aft direction of the vehicle 12 and is spaced substantially equidistant from the uppermost edge and the lowermost edge, i.e., the midline is positioned halfway along the air bag height H1.

The height H1 of the air bag 14 may be configured such that the front portion 70 of the air bag extends substantially between the hips 122 of the occupant 20 and the windshield 46 of the vehicle 12. When inflated, the front portion 70 may engage the windshield 46 or may be spaced from the windshield. The height H1 of the front portion 70 of the air bag 14 is sized to accommodate tall occupants 20 whose head 124 is normally positioned adjacent the vehicle roof.

The front portion 70, the rear portion 80, and the connecting portion 90 cooperate to define a space 100 positioned between the front portion from the rear portion and outside of the inflatable volume 60 of the air bag 14. The size of the front portion 70 and the connecting portion 90 are chosen such that the space 100 extends below the midline 98 of the air bag 14, i.e., the space has a depth from the uppermost edge of the air bag that is greater than half of the height H1 of the inflated air bag. Alternatively, the space 100 may have a depth that is half or less than half of the height H1 of the air bag 14 (not shown). The presence of the space 100 in the air bag 14 reduces the inflatable volume of the air bag in order to provide desirable inflation performance criterion.

One or more support members 110 further connect the rear portion 80 to the front portion 70. Although a pair of support members 110 are shown in FIG. 1, more or fewer support members may be provided, including zero (not shown). The support members 110 may have any shape that connects the front portion 70 to the rear portion 80, such as, for example, rectangular, square, triangular or the like. The support members 110 may extend in a fore-aft direction of the vehicle 12 and parallel to the midline 98 of the air bag 14 or may extend traverse to the midline. As viewed in FIG. 3, the support members 110 may extend at an angle relative to one another or may extend parallel to one another (not shown).

The support members 110 may include inflatable portions or ducts that are fluidly connected to the inflatable volume 60 of the portions 70, 80, 90 of the air bag 14 such that inflation fluid exiting the inflator 30 travels from the rear portion, through the support members, and into the front portion, thereby facilitating inflation of the front portion. Alternatively or additionally, the support members 110 may constitute or include non-inflatable portions (not shown), such as elastic or inelastic tethers or pieces of fabric. In any case, the support members 110 cooperate with the front and rear portions 70, 80 of the air bag 14 to define a top opening 114 in the air bag in fluid communication with the space 100. The support members 110 likewise cooperate with the front portion 70, the rear portion 80, and the connecting portion 90 to define lateral openings 112 on opposing sides of the space 100 and in fluid communication with the space.

The air bag 14, when deployed in response to an event for which occupant protection is desired, helps protect the occupant 20 by helping to absorb the force of impact placed on the air bag by the occupant. When the occupant 20 impacts the air bag 14, the occupant penetrates the air bag, which absorbs and distributes the impact forces throughout the area and volume of the bag. By "penetrates" into the air bag 14, it is meant to refer to the instance where, in the case of a frontal impact to the vehicle 12, the occupant is moved forward, as indicated by the arrow labeled 42 in FIGS. 2-5, into engagement with the air bag 14. The "penetration" of the occupant 20 into the air bag 14 is the distance or degree to which the occupant moves into the inflated depth of the air bag relative to the point at which the occupant first engages the inflated air bag, i.e., at the front panel 72 of the front portion 70. In other words, the degree of penetration could be measured as the distance a given point on the front panel 72 is moved toward the instrument panel 36 by the penetrating occupant 20. For example, the degree of penetration in FIG. 2 can be calculated as the difference between the fully inflated depth of the entire air bag 14 labeled P2 in FIG. 2, and the penetrated depth of the entire air bag labeled P3 in FIG. 2. Alternatively, penetration could be measured as the change in distance between a point on the front panel 72 and a fixed point on the instrument panel 36 or between a point on the occupant 20, e.g., the occupant's chest, and a fixed point on the instrument panel starting when the occupant first contacts the air bag (not shown).

Several factors determine the degree to which an occupant 20 penetrates the air bag 14. For example, the size or mass of the occupant 20, the speed at which the occupant strikes the air bag 14, the pressurization of the air bag, and whether or not the occupant is restrained by the seatbelt 18 all help determine the degree to which the occupant penetrates the air bag in a given deployment scenario.

Figure 3:
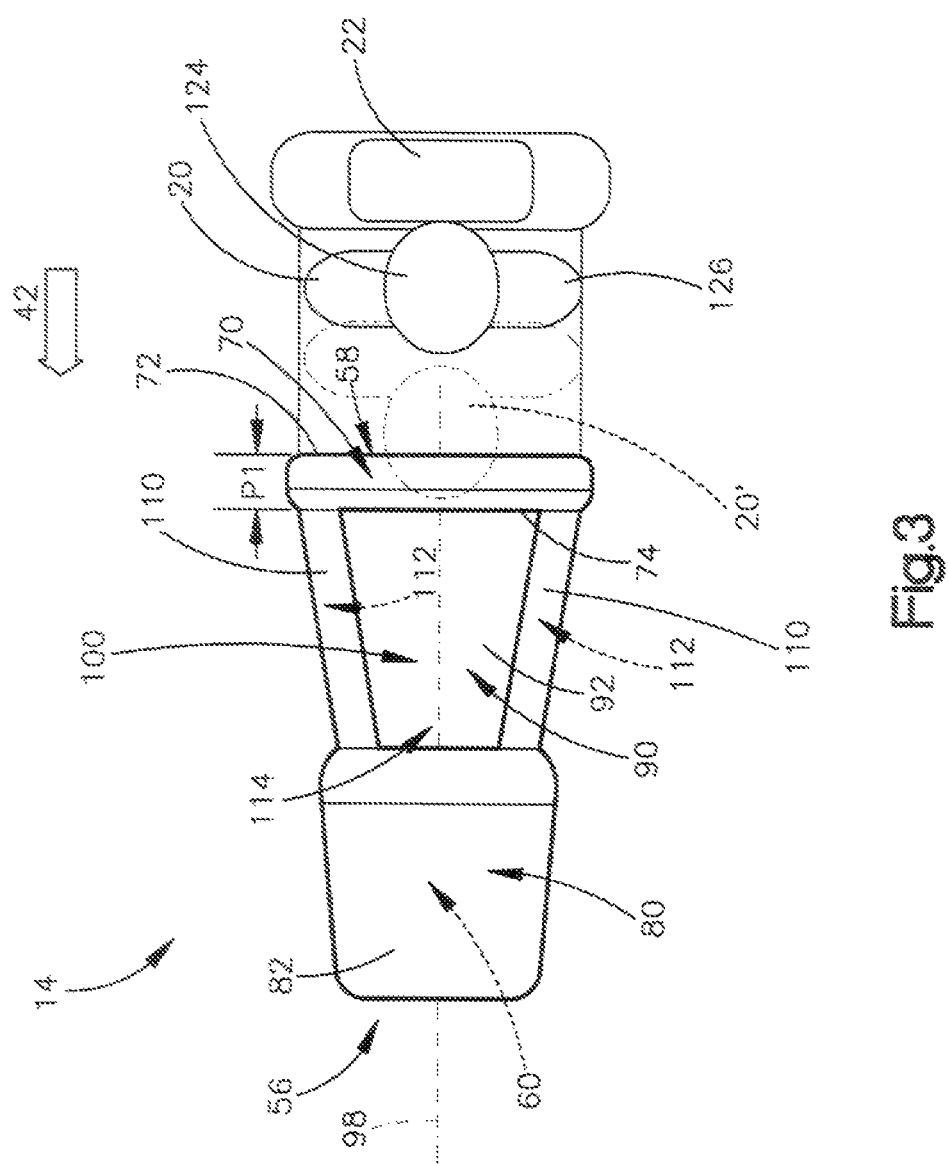
FIG. 3 is a schematic top view of the apparatus of FIG. 2.

As shown in FIGS. 2-3, in the case of a belted occupant 20, the seatbelt 18 serves to help restrain the occupant. As a result, the belted occupant 20, especially the occupant's lower torso 126 and hips 122, is restrained from moving toward the instrument panel 36. This allows the air bag 14 to inflate and deploy with comparatively little resistance or inhibition from the occupant 20. As shown in dashed lines at 20', the belted occupant's head 124 penetrates the front portion 70 of the air bag 14 and, more specifically, the front panel 72 of the air bag while the belted occupant's upper torso 126 penetrates the connecting portion 90 of the air bag.

Due to the configuration of the air bag 14, the front portion 70 is deflected by the penetrating occupant 20 in a direction towards the front of the vehicle 12 and, thus, in a direction towards the rear portion 80 of the air bag. Since the space 100 is positioned between the front portion 70 and the rear portion 80, the front portion is deflected into the space 100 and closer to the rear portion. As shown in FIGS. 2-3, the degree or distance to which the occupant 20' penetrates into the air bag 14 may be comparatively or relatively small. In any case, the air bag 14 may be configured such that the front portion 70 remains spaced from the rear portion 80 throughout full penetration of the occupant 20 into the front portion. When present, the support members 100 may limit relative movement between the front portion 70 and the rear portion 80 when the occupant 20 strikes and penetrates the air bag 14.

The front portion 70 of the air bag 14 is spaced from the rear portion 80 by the space 100. Restraint by the upper portions of the air bag 14 is softer than restraint by the lower portions because the front portion 70 can deflect into the space 100 in a pivotal fashion about the joining region to the connecting portion 90. The space 100 is not pressurized as it would be in an air bag volume that is continuous throughout the entire depth, so volume is reduced and restraint by the upper portions of the air bag 14 is initially softer relative to a continuous bag design. If the occupant 20 penetrates the air bag 14 enough that the front portion 70 contacts the rear portion 80, then the restraint will become stiffer such that contact to the instrument panel 36 can be avoided.

In contrast, the connecting portion 90 of the air bag 14 extends continuously from the instrument panel 36 to the occupant 20 without an open space. The connecting portion 90 therefore provides a stiffer restraint to the belted, penetrating occupant's lower torso 120 relative to the restraint provided to the occupant's head 124 and upper torso 126 by the front portion 70. The air bag 14 of the present invention is therefore advantageous in providing variable restraint to the belted, penetrating occupant 20' in order to meet desirable performance criterion.

Figure 4:
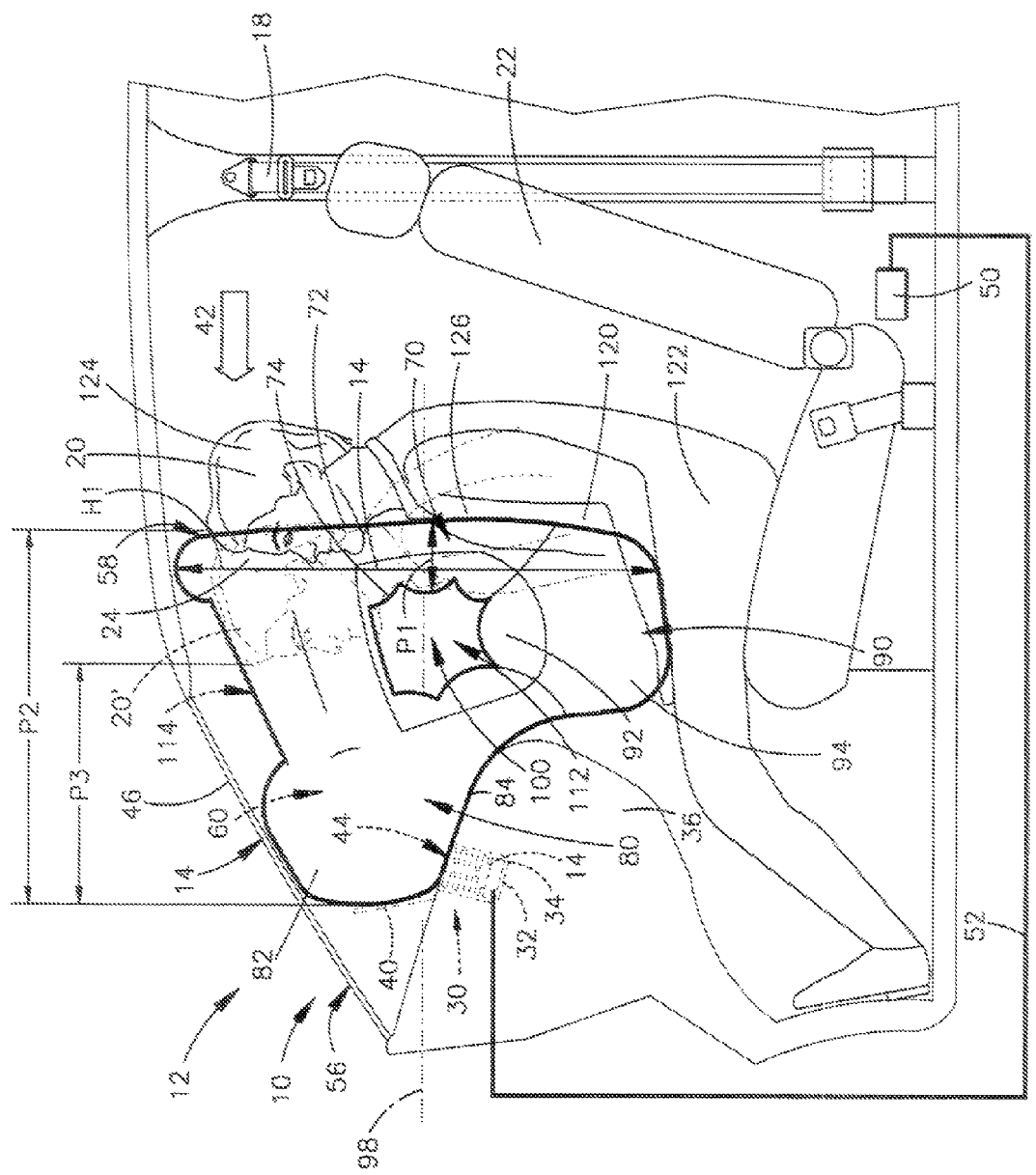
FIG. 4 is a schematic side view of the apparatus of FIG. 1 illustrating different conditions with an unbelted vehicle occupant.
Figure 5:
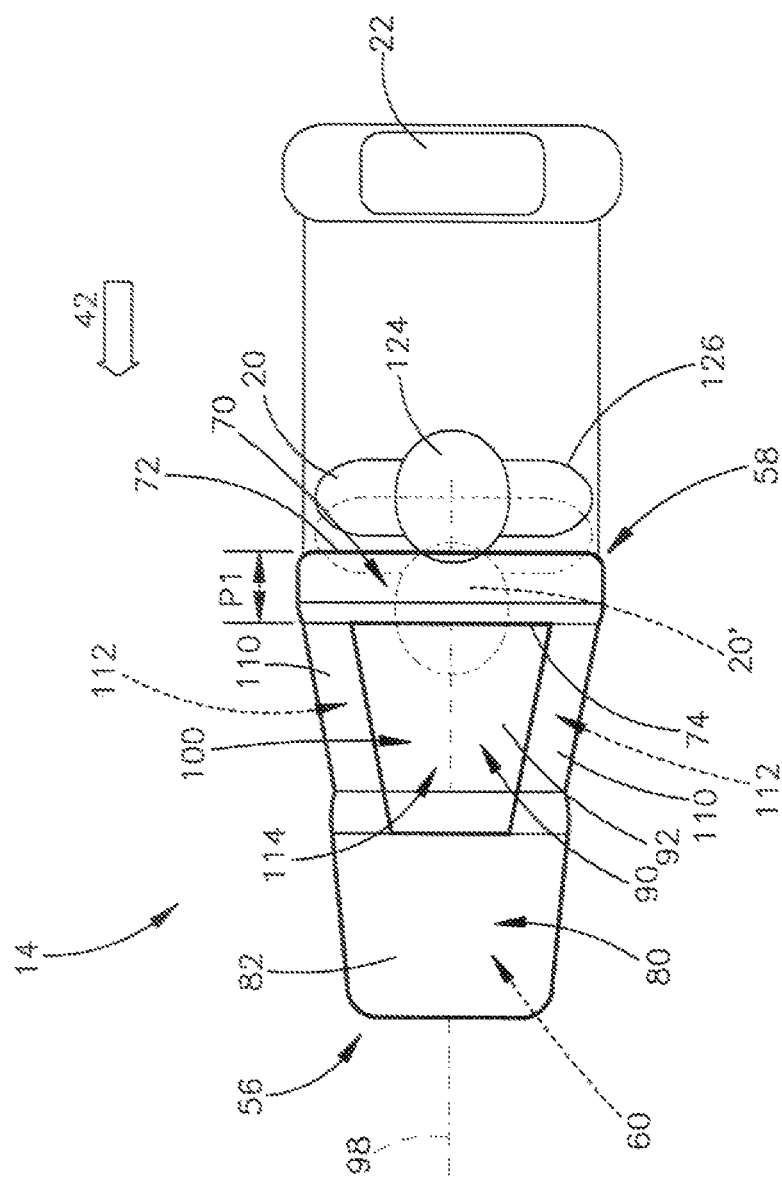
FIG. 5 is a schematic top view of the apparatus of FIG. 4.

As shown in FIGS. 4-5, in the case of an unbelted occupant 20, the seatbelt 18 does not help restrain the occupant 20. As a result, the unbelted occupant 20, including the occupant's lower torso 120 and hips 122, is not restrained from moving toward the instrument panel 36. Thus, as the air bag 14 inflates and deploys in response to the vehicle impact, the occupant's entire body moves unrestrained toward the instrument panel 36. As shown in dashed lines at 20', when this occurs, the unbelted occupant may also move upward toward the windshield 46 as the occupant moves toward the instrument panel 36. This can occur for several reasons. The bottom of the seat 22 may be inclined upward from rear to front, so the occupant 20, moving forward on the seat bottom, also moves upward. Also, the occupant 20, in moving forward, may also move from a reclined position to an upright position. Further, the occupant 20 may move upward off the seat (not shown) as he or she moves forward in the vehicle 12.

As shown in dashed lined in FIGS. 4-5, the unbelted occupant's head 124 and upper torso 126 penetrate the front portion 70 of the air bag 14 while the occupant's lower torso 120 penetrates the connecting portion 90. The degree or distance to which the occupant 20' penetrates the air bag 14 may be comparatively or relatively large or substantial when viewed in comparison with the belted occupant 20' (see FIG. 2).

The front portion 70 of the air bag 14 is spaced from the rear portion 80 by the space 100. Restraint by the upper portions of the air bag 14 is softer than restraint by the lower portions because the front portion 70 can deflect into the space 100 in a pivotal fashion about the joining region to the connecting portion 90. The space 100 is not pressurized as it would be in an air bag volume that is continuous throughout the entire depth, so volume is reduced and restraint by the upper portions of the air bag 14 is initially softer relative to a continuous bag design. If the unbelted occupant 20 penetrates the air bag 14 enough that the front portion 70 contacts the rear portion 80, then the restraint will become stiffer such that contact to the instrument panel 36 can be avoided.

In contrast, the connecting portion 90 of the air bag 14 extends continuously from the instrument panel 36 to the occupant 20 without an open space. The connecting portion 90 therefore provides a stiffer restraint to the unbelted, penetrating occupant's lower torso 120 relative to the restraint provided to the occupant's head 124 and upper torso 126 by the front portion 70. The air bag 14 of the present invention is therefore advantageous in providing variable restraint to the unbelted, penetrating occupant 20' in order to meet desirable performance criterion.

If the belted or unbelted occupant 20 penetrated into the air bag 14 sufficient to cause the front portion 70 to engage the rear portion 80, i.e., the space 100 between the front portion and the rear portion disappeared, the air bag of the present invention would produce substantially the same occupant restraint as two smaller volume air bags positioned adjacent to one another. In other words, such an air bag configuration would result in substantially the same homogenous occupant 20 restraint as a single volume air bag. This situation occurs with larger, unbelted occupants 20' and/or in higher speed crash events and this stiffening of restraint during the later stages of a crash event is advantageous for reducing the possibility of head to instrument panel contact. The space 100 of the present invention advantageously allows the air bag 14 to provide variable occupant 20 restraint by region, i.e., head 124 vs. torso 120, 126, as well as restraint that varies, i.e., stiffens, if and when the head and upper torso get close enough to the instrument panel 36 that the space 100 collapses to zero volume.

More specifically, those skilled in the art will appreciate that the air bag 14 of the present invention provides variable restraint to different portions of the vehicle occupant 20 regardless of the belted status of the occupant. In particular, the low volume configuration of the front portion 70 of the air bag 14, coupled with the size and depth of the space 100, helps to provide a softer restraint for the penetrating occupant's head 124 while providing a stiffer restraint for the torso 120, 126 of the penetrating occupant 20' whether the occupant is belted (FIG. 2) or unbelted (FIG. 4). The low volume configuration of the air bag 14 also facilitates earlier initiation of restraint since the reduced volume air bag can be positioned and filled more rapidly. Alternatively, there is potential to reduce the required size and cost of the inflator 32.

Since the unbelted occupant 20 is the worst case scenario, the inflator 32, the front portion 70, and the space 100 of the air bag 14 are sized to provide a volume of inflation fluid sufficient to inflate, deploy, and pressurize the air bag to the inflated condition of FIG. 2 within the desired performance parameters. This being the case, the volume of inflation fluid delivered by the inflator 32 is certainly sufficient to inflate, deploy, and pressurize the air bag 14 to the inflated condition of FIG. 1 within the desired performance parameters for a belted occupant. Since the belted occupant 20 is the expected condition, the front portion 70 and space 100 configurations of FIGS. 2-3 help bolster the reliability of the apparatus.

Furthermore, those having ordinary skill appreciate that the low volume construction of the air bag 14 of the present invention may allow the air bag to be free of active or adaptive venting while still providing variable restraint for the unbelted or belted occupant 20. The low volume construction of the air bag 14 of the present invention also allows the height H1 of the front portion 70 of the air bag to be increased sufficient to engage the windshield 46 to accommodate, taller occupants without compromising the ability of the air bag to provide variable occupant restraint.

Figure 6:
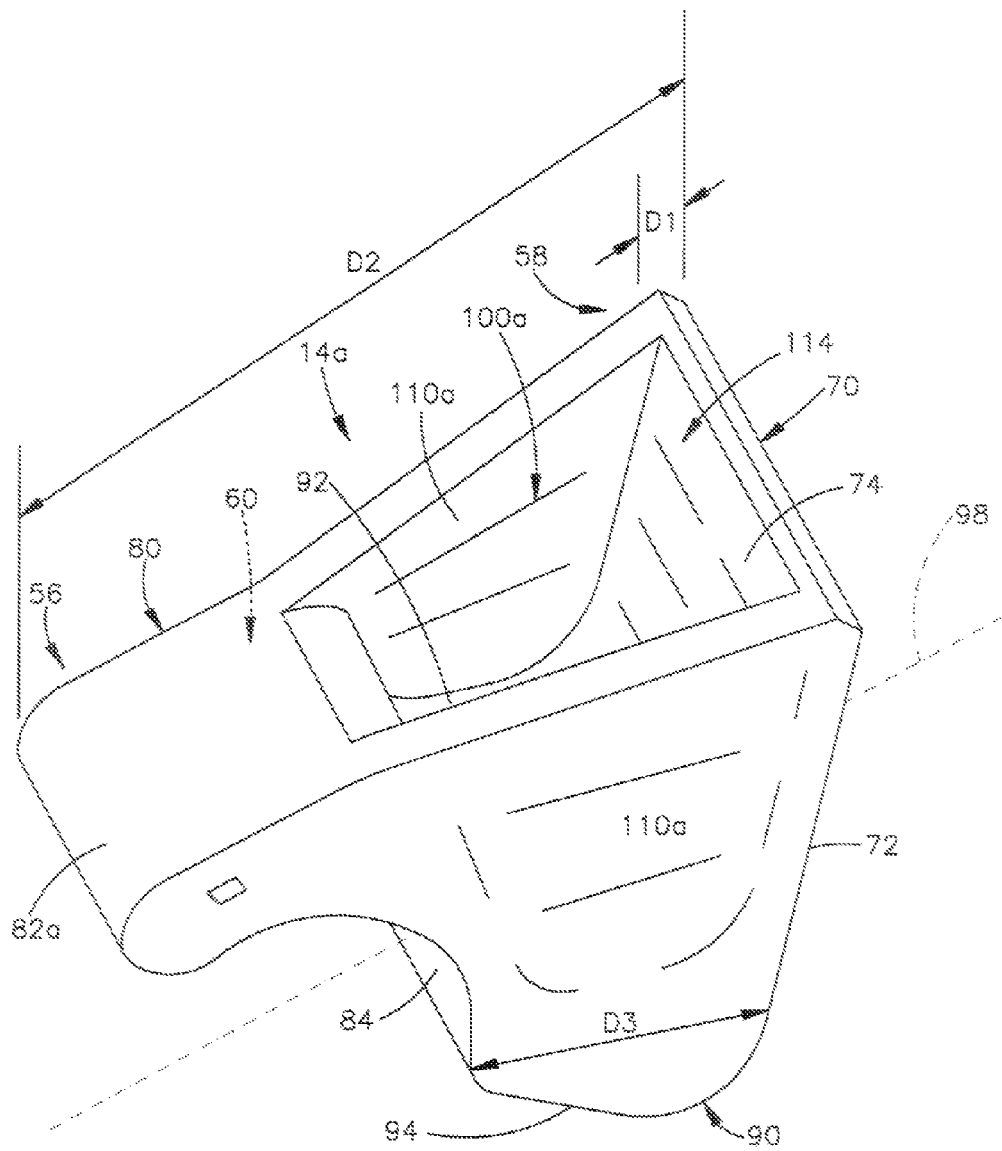
FIG. 6 is a schematic illustration of an apparatus for helping to protect an occupant of a vehicle in accordance with another embodiment of the present invention.

A second embodiment of the present invention is illustrated in FIG. 6. Certain components in FIG. 6 are similar or identical to components of FIGS. 1-5. These similar or identical components are given the same reference as FIGS. 1-5. On the other hand, the suffix "a" is added to the reference numbers of components in FIG. 6 that are dissimilar to the components of FIGS. 1-5 to avoid confusion.

The air bag 14a illustrated in FIG. 6 includes a front portion 70, a rear portion 80, and a connecting portion 90 connecting the front portion to the rear portion and defining the inflatable volume 60 of the air bag. In FIG. 6, however, the support members 110a connecting the front and rear portions 70, 80 extend down to the connecting portion 90 such that no lateral openings exist in the air bag. The enlarged support members 110a provide a greater degree of control over the relative movement between the front portion 70 and the rear portion 80 of the air bag 14a compared to the support members 110 spaced from the connecting portion 90 of the air bag 14 of FIGS. 1-5. Furthermore, in contrast to the rear portion 80 in FIGS. 1-5, which is sized to interact with the windshield 46 of the vehicle 12 to a large degree, the rear portion 80 of the air bag 14a is sized to interact with the windshield 46 to a lesser degree when the air bag deploys. Accordingly, when the air bag 14a is inflated the top panel 82a may not be in full contact with the windshield 46 of the vehicle 12. Alternatively, the rear portion 80 of the air bag 14a may be enlarged to interact with the windshield 46 of the vehicle 12 in a manner similar to the rear portion 80 of FIGS. 1-5 (not shown).

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle that has an instrument panel and a windshield, the apparatus comprising:
   an inflatable vehicle occupant protection device inflatable from a stored condition in the instrument panel to a deployed condition between the instrument panel and the vehicle occupant, the protection device comprising:
   a front portion comprising an inflatable volume presented toward the occupant and positioned for receiving a penetrating occupant when the protection device is in the deployed condition;
   a rear portion comprising an inflatable volume spaced from the front portion by a space and positioned between the front portion and the instrument panel when the protection device is in the deployed condition;
   a lower portion comprising an inflatable volume that interconnects lower portions of the front portion and the rear portion and provides fluid communication between the front and rear portions; and
   lateral support members comprising inflatable volumes that connect the front and rear portions and provide fluid communication between the front and rear portions, the lateral support members biasing the front portion away from the rear portion and resisting movement of the front portion toward the rear portion in response to the penetrating occupant, the space extending from an opening in an upper extent of the protection device defined by the length of each lateral support member.

2. The apparatus recited in claim 1, wherein the rear portion is configured to extend from adjacent the instrument panel to adjacent-the windshield to stabilize the protection device.

3. The apparatus recited in claim 1, wherein the front portion, the rear portion, and the lower connecting portion are arranged in a U-shaped configuration facing concavely upward in the vehicle.

4. The apparatus recited in claim 3, wherein the lateral support members maintain the spacing of the front and rear portions, which define the vertical components of the generally U-shaped configuration.

5. The apparatus recited in claim 1, wherein the inflatable volumes of the front portion, rear portion, lower portion, and lateral support portions define a space between the front portion and rear portion.

6. The apparatus recited in claim 5, wherein the space is positioned between the front portion and the rear portion to provide a first resistance to occupant penetration into the protection device, the lower connecting portion providing a second resistance to occupant penetration that is greater than the first resistance.

7. The apparatus recited in claim 5, wherein the space is open through an upper extent of the protection device and closed at a lower extent of the protection device.

8. The apparatus recited in claim 5, wherein the space extends from an upper extent of the protection device down to below a midline of the protection device and is bounded at a lower extent by the lower portion.

9. The apparatus recited in claim 8, wherein the space is bounded at lateral extents by the lateral support members.

10. The apparatus recited in claim 5, wherein the space extends from an opening in an upper extent of the protection device towards the lower portion, the opening extending from the front portion to the rear portion.

11. The apparatus recited in claim 1, wherein the spaced portions of the front and rear chambers comprise head and upper torso receiving portions of the protection device, the lateral support members maintaining the spaced relationship of the head and upper torso receiving portions.

12. The apparatus recited in claim 1, wherein the lateral support members are spaced on opposite lateral sides of protection device and positioned laterally of a head receiving area of the front portion.

13. The apparatus recited in claim 1, wherein the inflatable volume of the rear portion spans the width of the protection device from an upper extent of the rear portion to the intersection with the lower portion.

14. The apparatus recited in claim 1, wherein the lower portion spans the width of the protection device.

15. The apparatus recited in claim 1, wherein the lateral support members are spaced from the lower portion and to define lateral openings in the protection device.

16. The apparatus recited in claim 1, wherein the lateral support members maintain the spacing of the front and rear portions.

17. The apparatus recited in claim 1, wherein occupant penetration into the lower portion produces a corresponding increase in fluid pressure in the lateral support members, thus producing a corresponding increase in the biasing of the front portion away from the rear portion and increasing the support member resistance to movement of the front portion toward the rear portion in response to the penetrating occupant.

18. The apparatus recited in claim 1, wherein the front portion includes a front panel that spans the height and width of the protection device.

19. The apparatus recited in claim 1, wherein the inflatable volume of the front portion spans the width of the protection device from an upper extent of the front portion to the intersection with the lower portion of the protection device.

20. The apparatus recited in claim 1, wherein the inflatable volume of the lower portion spans the width of the protection device from the front portion to the rear portion.

21. An apparatus for helping to protect an occupant of a vehicle that has an instrument panel and a windshield, the apparatus comprising:

an inflatable vehicle occupant protection device having an inflatable volume positioned between the instrument panel and the vehicle occupant, the protection device comprising:

a front wall comprising an inflatable volume that spans the width of the protection device and has a height adapted to receive the head and torso of a penetrating occupant;

a rear wall comprising an inflatable volume that spans the width of the protection device and extends adjacent the windshield down along an occupant-facing surface of the instrument panel;

a lower portion comprising an inflatable volume that interconnects the front and rear walls, the lower portion providing fluid communication between the front and rear walls; and inflatable lateral support members comprising inflatable volumes that interconnect the front and rear walls and maintain an open central space between the front and rear walls, the open central space extending from an opening in an upper extent of the protection device defined by the length of each lateral support member.

* * * * *